US012729712B2

(12) United States Patent
Chalvet

(10) Patent No.: US 12,729,712 B2
(45) Date of Patent: Sep. 8, 2026

(54) ASSEMBLY LOCKING DEVICE, A CONNECTING BOLT IN COMBINATION WITH THE ASSEMBLY LOCKING DEVICE, A COMPONENT WITH A PRE-INSTALLED CONNECTING BOLT BY MEANS OF THE ASSEMBLY LOCKING DEVICE AS WELL AS A MANUFACTURING METHOD FOR THE ASSEMBLY LOCKING DEVICE AND AN ASSEMBLY METHOD OF A CONNECTING BOLT WITH THE ASSEMBLY LOCKING DEVICE WITHIN A COMPONENT OPENING

(71) Applicant: Bollhoff Otalu S.A., La Ravoire (FR)

(72) Inventor: Franck Chalvet, Saint-Baldoph (FR)

(73) Assignee: Bollhoff Otalu S.A., La Ravoire (FR)

( * ) Notice: Subject to any disclaimer, the term of this patent is extended or adjusted under 35 U.S.C. 154(b) by 384 days.

(21) Appl. No.: 18/227,000

(22) Filed: Jul. 27, 2023

(65) Prior Publication Data

US 2024/0035511 A1 Feb. 1, 2024

(30) Foreign Application Priority Data

Jul. 28, 2022 (EP) .................................... 22306132

(51) Int. Cl.
*F16B 41/00* (2006.01)

(52) U.S. Cl.
CPC .................................. *F16B 41/002* (2013.01)

(58) Field of Classification Search
CPC ....... F16B 41/002; F16B 2/248; F16B 5/0208
(Continued)

(56) References Cited

U.S. PATENT DOCUMENTS

| | | | |
|---|---|---|---|
| 2,201,930 | A | 5/1940 | Stark |
| 3,263,728 | A | 8/1966 | Lynch |

(Continued)

FOREIGN PATENT DOCUMENTS

| | | | |
|---|---|---|---|
| BE | 648223 | A | 9/1964 |
| CN | 101377212 | A | 3/2009 |

(Continued)

OTHER PUBLICATIONS

DIN 13—ISO Metric Screw Threads; 1 mm to 300 mm Diameter Coarse and Fine Pitch Threads; Selected Diameters and Pitches; DIN ISO 000261; Oct. 1988 (5 pages).

(Continued)

*Primary Examiner* — Jason D Shanske
(74) *Attorney, Agent, or Firm* — Reising Ethington P.C.

(57) ABSTRACT

A thread bolt with a threaded shaft and a bolt head, and an assembly locking device positionable on the shaft in a loss-proof manner and the thread bolt is arrangeable in a pull-out-proof manner inserted into a component opening with the help of the assembly locking device. The assembly locking device includes a wire coil having a first end and a second end, a holding turn, a clamping coil portion, and a positioning turn, having a smaller or no pitch compared with the clamping coil portion. An end of the shaft, facing away from the head, of the thread bolt is receivable in the positioning turn and the thread bolt is aligned in the component opening in a clamping manner with the help of the holding turn and the positioning turn.

17 Claims, 10 Drawing Sheets

(58) Field of Classification Search
USPC .......................................................... 411/347
See application file for complete search history.

(56) References Cited

U.S. PATENT DOCUMENTS

| | | | | |
|---|---|---|---|---|
| 6,752,577 | B2 * | 6/2004 | Chen | H01L 23/4093 411/544 |
| 8,434,983 | B2 | 5/2013 | Chen | |
| 8,585,337 | B1 * | 11/2013 | Dang | H01R 13/74 411/347 |
| 9,664,226 | B2 | 5/2017 | Schneider et al. | |
| 2009/0060680 | A1 | 3/2009 | Chen | |
| 2018/0195540 | A1 | 7/2018 | Stastny et al. | |
| 2022/0003264 | A1 * | 1/2022 | Clark | F16B 5/025 |

FOREIGN PATENT DOCUMENTS

| | | | | |
|---|---|---|---|---|
| DE | 29724014 | U1 | 10/1999 | |
| DE | 102009036820 | A1 | 2/2011 | |
| DE | 102020210432 | A1 * | 2/2022 | F16B 2/08 |
| ES | 2715686 | T3 * | 6/2019 | F16B 5/0233 |
| GB | 1068185 | A | 5/1967 | |
| WO | WO2011015350 | A1 | 2/2011 | |
| WO | WO-2015039997 | A1 * | 3/2015 | B25B 33/00 |
| WO | WO-2025132274 | A1 * | 6/2025 | F16B 5/0266 |

OTHER PUBLICATIONS

DIN 13-1—ISO General Purpose Metric Screw Threads—Part 1: Nominal Sizes for Coarse Pitch Threads; Nominal Diameter from 1 mm to 68 mm; Nov. 1999 (4 pages).
DIN 13-2—General Purpose ISO Metric Screw Threads—Part 2: Nominal Sizes for 0.2 mm, 0.25 mm and 0.35 mm Fine Pitch Threads with Diameters from 1 mm to 50 mm; Nov. 1999 (5 pages).
DIN 13-4—ISO General Purpose Metric Screw Threads—Part 4: Nominal Sizes for 0.75 m Fine Pitch Threads; Nominal Diameter from 5 mm to 110 mm; Nov. 1999 (5 pages).
Unified Inch Screw Threads (UN and UNR Thread Form); The American Society of Mechanical Engineers; Sep. 30, 2004 (190 pages).
International Standard—Electrical Insulating Materials—Thermal Endurance Properties—Part 1: Ageing Procedures and Evaluation of Test Results; IEC 60216-1; Mar. 2013 (70 pages).
International Standard—Electrical Insulating Materials—Thermal Endurance Properties—Part 8: Instructions for Calculating Thermal Endurance Characteristics Using Simplified Procedures; IEC 60216-8; Mar. 2013; (42 pages).
CN Office Action for CN Application No. 202310944808.4 dated Jul. 15, 2026 (10 pages).

* cited by examiner 1
16
12
14
19
20
$R_W$
18
S
$D_P$
L
Z 1
16
$D_H$
12
$R_W$
14
$D_K$
19
20
$D_M$
18
S
L
Z

ASSEMBLY LOCKING DEVICE, A CONNECTING BOLT IN COMBINATION WITH THE ASSEMBLY LOCKING DEVICE, A COMPONENT WITH A PRE-INSTALLED CONNECTING BOLT BY MEANS OF THE ASSEMBLY LOCKING DEVICE AS WELL AS A MANUFACTURING METHOD FOR THE ASSEMBLY LOCKING DEVICE AND AN ASSEMBLY METHOD OF A CONNECTING BOLT WITH THE ASSEMBLY LOCKING DEVICE WITHIN A COMPONENT OPENING

CROSS REFERENCE TO RELATED APPLICATIONS

This application claims the priority to EP Patent Application No. EP22306132.6 filed on Jul. 28, 2022, and the entire content of this priority application is incorporated herein by reference in its entirety.

TECHNICAL FIELD

The present disclosure relates to an assembly locking device for pre-installing a connecting bolt in a component opening. Furthermore, a connecting bolt in combination with the assembly locking device is provided to be pre-installed in a component opening facilitating a subsequent connecting with a further component. Additionally, a component with a pre-installed connecting bolt by means of the assembly locking device as well as a manufacturing method for the assembly locking device and an assembly method of a connecting bolt with the assembly locking device within a component opening are provided.

BACKGROUND

From the prior art, different assembly locking devices are known as for example described in U.S. Pat. No. 9,664,226 B2, DE 10 2009 036 820 A1, or U.S. Pat. No. 3,263,728 A. These assembly locking devices most often consist of several parts, and, thus, are complex to be manufactured and assembled on a component opening.

It is therefore the object of at least some implementations of the present disclosure to provide a more simple and effective assembly locking device as compared to the prior art.

SUMMARY

The above object is solved by an assembly locking device, a thread bolt in combination with the assembly locking device, a component with a pre-installed connecting bolt by means of the assembly locking device as well as a component with a pre-installed connecting bolt by means of the assembly locking device in combination with an outer threaded bushing, a manufacturing method for the assembly locking device, an assembly method of a connecting bolt with the assembly locking device within a component opening, and an assembly method of a connecting bolt with the assembly locking device in combination with an outer threaded bushing, as well as a connecting method for a first and a second component.

Advantageous designs and further developments of the present disclosure arise from the following description, the accompanying drawings as well as the appending claims.

The present disclosure provides an assembly locking device adapted to a shaft of a connecting bolt, which may be a thread bolt, with a bolt head so that the assembly locking device is positionable on the shaft in a loss-proof manner and the connecting bolt is arrangeable in a pull-out-proof manner inserted into a component opening with the help of the assembly locking device. The assembly locking device includes the following features: a wire coil comprised of a plurality of helically wound turns, the coil having a first end and a second end, starting at the first end of the wire coil, a holding turn is provided which extends over an angular range of at least 3600 about a central longitudinal axis of the wire coil and comprises an inner diameter $D_H$, following the holding turn, a clamping coil portion is arranged that is formed like a truncated cone having a plurality of subsequent turns of an increasing inner diameter $D_K$ compared with the holding turn, with the clamping coil portion extending over at least two turns about the central longitudinal axis of the wire coil and comprises a pitch $P_W$ that is larger compared with the holding turn, and following the clamping coil portion and at the second end of the wire coil, a positioning turn is provided, extending over an angular range of at least 2700 about the central longitudinal axis of the wire coil, having an inner diameter $D_P$ for which $D_K > D_P \geq D_H$ applies, and having a smaller or no pitch $P_P$ compared with the clamping coil portion, so that an end of the shaft, facing away from the head, the connecting bolt is receivable in the positioning turn and the thread bolt is holdable aligned in the component opening in a clamping manner with the help of the holding turn and the positioning turn.

The assembly locking device is based on a simple and inexpensive wire construction. It serves for pre-positioning or pre-installation of a connecting bolt within a component opening to facilitate a subsequent connection process of the first component to a second component. The assembly locking device may be combined with a bolt-like connecting element having a bolt head and a bolt shaft with a connecting structure. A connecting structure may be formed by a thread, a clamping or snapping structure, a riveting structure or the like.

The wire construction of the assembly locking device serves for holding the connecting bolt, which may be a thread bolt, in position for fastening at the second component. To this end, a helically wound wire structure includes at a first end the holding turn adapted to hold the shaft of the thread bolt or to be hold on that shaft. At a second end of the helically wound wire coil, a positioning turn is provided for orienting the thread bolt in front of the component opening. For suitable orientation of the connecting bolt, the holding turn and the positioning turn may be coaxially aligned with respect to a longitudinal center axis of the assembly locking device.

In between the holding turn and the positioning turn, the clamping coil is arranged to retain the assembly locking device in a component opening. To this end, the clamping coil has a larger diameter as compared to the holding turn and the positioning turn. Further, the clamping coil is larger in diameter than an inner diameter of a component opening so that the clamping coil can fasten itself therein by a frictional connection. Furthermore and based on its truncated cone shape contour, the clamping coil portion may allow for a radial relocatability of a shaft tip of the connecting bolt while retaining the head of the connecting bolt mainly in its place. Even though the connecting bolt is retained within the component opening by means of the assembly locking device, the construction of the assembly locking device provides an elastic flexibility to orientate the connecting bolt for preparing the connecting process to a second component. Thus, the assembly locking device provides a thread bolt pre-holding system based on a simple wire coil construction using frictional forces for holding and positioning the connecting bolt.

According to a further embodiment, the connecting bolt is a thread bolt and the inner diameter $D_H$ of the holding turn of the assembly locking device is adapted to an outer thread on the shaft of the thread bolt such that the following applies: $d_3 \geq D_H \geq 0.6\ d_3$, which may be $d_3 \geq D_H \geq 0.65\ d_3$, or $d_3 \geq D_H \geq 0.7\ d_3$, or $d_3 \geq D_H \geq 0.90\ d_3$ or $d_3 \geq D_H \geq 0.92\ d_3$, or $d_3 \geq D_H \geq 0.95\ d_3$, wherein d3 denotes a core diameter of a standard thread on the shaft.

According to a further embodiment, the assembly locking device may be adapted to a connecting bolt configured as a thread bolt having a transition shoulder between the bolt head and the bolt shaft. The holding turn is adapted in size to retain the assembly locking device at the transition shoulder. Therefore, the inner diameter $D_H$ of the holding turn is adapted to an outer diameter $d_S$ of the transition shoulder between the bolt shaft and the bolt head wherein the outer diameter $d_S$ of the transition shoulder is: $1.4\ d_3 \geq d_S \geq 1.05\ d_3$, which may be $1.35\ d_3 \geq d_S \geq 1.05\ d_3$, or $1.3\ d_3 \geq d_S \geq 1.05\ d_3$, or $1.25\ d_3 \geq d_S \geq 1.05\ d_3$ or $1.2\ d_3 \geq d_S \geq 1.05\ d_3$, or $1.15\ d_3 \geq d_S \geq 1.05\ d_3$, or $1.1\ d_3 \geq d_S \geq 1.05\ d_3$, and the following applies for the inner diameter $D_H$ of the holding turn (14): $d_S \geq D_H \geq 0.6\ d_S$, which may be $d_S \geq D_H \geq 0.65\ d_S$, or $d_S \geq D_H \geq 0.7\ d_S$, or $d_S \geq D_H \geq 0.75\ d_S$, or $d_S \geq D_H \geq 0.8\ d_S$, or $d_S \geq D_H \geq 0.85\ d_S$, or $d_S \geq D_H \geq 0.90\ d_S$ or $d_S \geq D_H \geq 0.92\ d_S$, wherein $d_3$ denotes a core diameter of a standard outer thread on the shaft, which may be a normalized outer thread, or a metrical DIN outer thread or an imperial ASTM outer thread.

The assembly locking device may be adapted to thread bolts having a bolt head and bolt shaft. According to different constructions of the thread bolt, the shaft may be connected directly to the bolt head, or via a transition shoulder or via a transition groove. The holding turn realizes a frictional fixing of the assembly locking device on the bolt shaft below the bolt head. Consequently, the holding turn may be dimensioned and sized to retain the assembly locking device on the shaft directly, or on the transition shoulder or on a transition groove arranged below the bolt head.

In order to qualify the dimensions of the assembly locking device, the thread bolt may have a standard thread on the thread shaft. Adapted to the standard thread geometry, the thread bolt fulfills known geometry data to which the geometry of the assembly locking device may correspond.

According to a further embodiment, the outer thread of the thread shaft is a normalized outer thread, which may be a metrical DIN outer thread or an imperial ASTM outer thread.

Further, the outer thread may be a normalized standard thread RG with geometrical data according to the DIN standard DIN 13-1 and DIN 13-12 or a normalized fine thread with geometrical data according to DIN standards DIN 13-2 to DIN 13-12, wherein the geometrical data for the normalized standard thread RG and the geometrical data for the normalized fine thread FG define the core diameter $d_3$ with which the holding turn of the assembly locking device is dimensionable.

According to a further embodiment, the holding turn starts with a tangentially extending tang which extends in a tangential direction with respect to the holding turn for preventing damage of the thread on the thread bolt.

According to a further embodiment, a retaining portion, which may be a cylindrical retaining portion, may be provided between the clamping coil portion and the positioning turn adapted to retain the assembly locking device within a component opening wherein the cylindrical retaining portion extends over an angular range of at least 270°, which may be at least 360°, about the central longitudinal axis L of the wire coil.

Based on the cylindrical shape of the retaining portion, which may be denoted as a retaining turn, the retaining portion realizes a frictional radial contact interface to an inner wall of the component opening. Based thereon, the retaining portion additionally provides a frictionally type connection between the assembly locking device and the component via the inner wall of the component opening.

At least 90% of the retaining turns of the retaining portion, or 100%, contact the radial inner wall of the component opening after pre-installation of the connecting bolt within the component opening. The contact may be enabled by a constant minimum radius of the retaining turn of the retaining portion with respect to the longitudinal center middle axis L of the wire coil.

Further, the clamping coil portion directly may merge into the cylindrical retaining portion. Thereby, the assembly locking device has a compact configuration realizing several functions in a space saving manner.

The wire coil of the assembly locking device is manufactured by winding (see below). To limit the wire coil in length, the wire is cut at its ends which may lead to sharp edges or burr. To prevent damages at the connecting bolt, which may be at the thread of the thread bolt, the holding turn of the assembly locking device has a starting tang. The starting tang extends in a tangential direction at the first end of the wire coil of the assembly locking device. The starting tang may relocate the first cut end of the wire coil to a position having a protecting distance to the outer thread on the thread shaft. Even if the holding turn tightly grips the thread shaft for fixing the assembly locking device thereon, the cut end of the starting end does not contact the outer thread on the shaft based on the use of the tangential starting tang.

Further, the holding turn may extend over at least 720° and windings of the holding turn, which are adjacent to one another, are wound on block.

According to a further embodiment, a last turn of the positioning turn may be arranged at the end of the wire coil with an adjacent turn of an increasing inner diameter in a common plane perpendicular to the central longitudinal axis of the wire coil.

The positioning turn is larger in diameter as compared to the holding turn. Nevertheless, the holding turn and the positioning turn may be coaxially aligned to each other. Thereby, a thread bolt retained by the holding turn and the positioning turn may be oriented in parallel to a longitudinal axis of a component opening for connecting to a second component. Furthermore, the positioning turn allows for a lateral deflection of the thread shaft while retained by the holding turn. Thereby, a positioning of a leading end of the thread bolt in view of the component opening is facilitated.

The wire coil may be made of a spring wire or a plastic wire having a thickness in the range of 0.3 mm to 1.7 mm.

The present disclosure further includes a thread bolt with a shaft and a bolt head wherein the shaft comprises a thread, which may be a normalized standard thread RG or a normalized fine thread FG as well as an assembly locking device according to the above-described embodiments, which is held in a loss-proof manner on the shaft by means of the holding turn adjacent to the bolt head.

Furthermore, the present disclosure includes a thread bolt with a shaft, a bolt head and a transition shoulder therebetween, wherein the transition shoulder has an outer diameter $d_S$ amounting to: 1.3 $d_3 \geq d_S \geq 1.05$ $d_3$, which may be 1.2 $d_3 \geq d_S \geq 1.05$ d3 or 1.15 $d_3 \geq d_S \geq 1.05$ d3, the shaft comprises a thread, which may be a normalized standard thread RG or a normalized fine thread FG, as well as an assembly locking device according to one of the above-described constructional alternatives, which is held in a loss-proof manner on the transition shoulder by means of the holding turn adjacent to the bolt head.

By means of different constructions of the assembly locking device as described above, a connecting bolt, which may be a thread bolt, is retained in a component opening. To this end, the assembly locking device is made of the wire coil made of helically wound turns. Based on the use of a resiliently deformable wire coil, which may be made of metal or plastic material, the assembly locking device is arranged on a connecting bolt with low efforts and based on frictional interface forces between the wire coil and the bolt shaft. Furthermore, the assembly locking device enables a releasable positioning of the connecting bolt within a component opening. To this end, the clamping coil portion is deformed to fit into the component opening and self expanded to hold the connecting bolt within the component opening by means of the assembly locking device.

According to a further embodiment, the thread of the thread bolt is defined as a normalized standard thread RG or a normalized fine thread FG on the shaft by the normalized nominal diameter d3 and the shaft has, in combination with the assembly locking device, an outer diameter $D_M$ from the range: 40 $d_3 \geq D_M \geq 2$ $d_3$, which may be 35 $d_3 \geq D_M \geq 2$ $d_3$, or 30 $d_3 \geq D_M \geq 2$ $d_3$, or 25 $d_3 \geq D_M \geq 2$ $d_3$, or 20 $d_3 \geq D_M \geq 2$ $d_3$, or 15 $d_3 \geq D_M \geq 2$ $d_3$, so as to hold the connecting bolt in a loss-proof manner in a component opening.
Further, a turn direction of the assembly locking device may be equal to a thread direction of the thread on the shaft so that the clamping coil portion of the assembly locking device may enlarge in diameter while rotating the thread bolt together with the assembly locking device within an opening.

In order to realize the different functions of the assembly locking device in combination with the thread bolt, the turn direction of the assembly locking device coincides with the thread direction of the outer thread on the shaft. If the thread bolt is rotated against a thread direction, the assembly locking device may be decreased in diameter in the clamping portion. Thereby, a positioning of the thread bolt within the component opening is facilitated.

If the assembly locking device is rotated in its turn direction by means of the thread bolt, the clamping portion is enlarged in diameter. As a consequence, frictional forces between the clamping portion and an inner wall of a component opening or an outer threaded bushing are increased. Thereby, rotation of the outer threaded bushing within a threaded component opening is enabled to compensate tolerances by means of the threaded bushing between the first and the second component (see below).

Thus, the clamping coil portion may be retained within an inner opening of the outer threaded bushing so that a torque of the thread bolt is transferable via the assembly locking device to the outer threaded bushing.

Furthermore, the outer threaded bushing may have a stepped inner opening, and/or a friction ring is mounted on the outer bushing surface for locking the outer threaded bushing within a threaded opening, which may be within a component opening.

Dependent on a preinstallation route of the component, the outer threaded bushing is preinstalled in a component opening in combination with the assembly locking device and the thread bolt. During transport of the preinstalled component, vibrations of the component may loosen or release the threaded bushing from the component opening. A friction ring bridging a gap between the outer thread of the bushing and an inner thread of the component opening may generate frictional forces preventing a rotation of the threaded bushing.

Additionally, the disclosure includes a component having a component opening being stepped or not stepped in axial direction as well as being provided as a passage hole or blind hole, wherein in the component opening, the thread bolt according to the above-described embodiments is arranged by means of an assembly locking device in a pull-out-proof manner.

The present disclosure further provides a component having a threaded component opening being provided as a passage hole, wherein in the threaded component opening, the outer threaded bushing in combination with the thread bolt and the assembly locking device as described above may be arranged, for tolerance compensation while connecting the component to another component by the thread bolt.

A manufacturing method of an assembly locking device, which may be an assembly locking device according to one of the above-described constructional alternatives is also provided by the present disclosure. The manufacturing method comprise the following steps: winding a wire to form a wire coil consisting of a plurality of screw-like wound windings of the wire, having a first and a second end, wherein starting at the first end of the wire coil, a holding turn is provided which extends over an angular range of at least 360° about a central longitudinal axis of the wire coil and comprises an inner diameter $D_H$, following the holding turn, a clamping coil portion is arranged that is formed like a truncated cone having a plurality of subsequent turns of an increasing inner diameter $D_K$ compared with the holding turn, with the clamping coil portion extending over at least two turns about the central longitudinal axis of the wire coil and comprises a pitch $P_W$ that is larger compared with the holding turn, and following the clamping coil portion and at the end of the second end of the wire coil, a positioning turn is provided, extending over an angular range of at least 2700 about the central longitudinal axis of the wire coil, having an inner diameter $D_P$ for which $D_K > D_P \geq D_H$ applies, and having a smaller or no pitch $P_P$ compared with the clamping coil portion, so that an end of the shaft, facing away from the head, of the thread bolt is receivable in the positioning turn and the thread bolt is holdable aligned in the component opening in a clamping manner by means of the holding turn and the positioning turn.

Furthermore, the present disclosure provides an assembly method of a thread bolt according to one of the above constructional alternatives within a component opening of a component to be connected to another component. The assembly method comprises the steps: axially moving (step M1) the connecting bolt with assembly locking device in the direction of the central longitudinal axis into the component opening of the component, during the axially moving of the connecting bolt with assembly locking device into the component opening of the component, generating a relative rotation (step M2) between the component opening and the connecting bolt with assembly locking device, so that the assembly locking device decreases an outer diameter of the clamping coil portion within the component opening, stopping the axial moving (step M3) of the connecting bolt with assembly locking device into the component opening of the component and generating a contrary relative rotation (step M4) compared with step M2, so that the assembly locking device increases the outer diameter of the clamping coil portion within the component opening and retains the connecting bolt in the component opening in a releasable manner.

With respect to the above-described assembly method, in step M2: rotating the thread bolt with assembly locking device in turn direction of the assembly locking device while the assembly locking device may be fixedly held by means of the holding turn on the connecting bolt, so that the outer diameter of the clamping coil portion decreases.

In step M3: rotating the thread bolt with assembly locking device contrary to the turn direction of the assembly locking device while the assembly locking device may be fixedly held on the connecting bolt by means of the holding turn so that the outer diameter of the clamping coil portion increases.

According to a further embodiment, the assembly method has the further step (step M5): rotating the connecting bolt with assembly locking device in a thread direction of the thread on the shaft and thereby fastening the connecting bolt in a receiving thread of a further component.

The present disclosure provides a further assembly method of a thread bolt in combination with a threaded bushing within a component opening having an inner thread of a component to be connected to another component. The assembly method comprises axially moving (step M1) the connecting bolt with assembly locking device and the threaded bushing in the direction of the central longitudinal axis into the component opening of the component, during the axially moving of the connecting bolt with assembly locking device and the threaded bushing into the component opening of the component, generating a relative rotation (step M2) between the component opening and the connecting bolt with assembly locking device and the threaded bushing, so that the threaded bushing is screwed into the threaded component opening, stopping the axial moving (step M3) of the connecting bolt with assembly locking device and the threaded bushing into the component opening of the component.

The present disclosure further provides a connecting method of a first component and a second component, wherein the first component has a component opening being provided as a passage hole according to the above, and the second component has a second threaded opening adapted to the thread bolt, wherein the connecting method comprises the following steps: arranging the first component and the second component opposite to each other so that the thread bolt of the first component is aligned with the second threaded opening of the second component, compressing the axial locking device in an axial direction of the thread bolt thereby introducing a tip of the thread bolt into the threaded opening of the second component, screwing the thread bolt of the first component into the threaded opening of the second component so that the first and the second component are connected to each other.

Furthermore, the present disclosure includes a connecting method of a first component and a second component with tolerance compensation between the first and the second component, wherein the first component has a threaded component opening being provided as a passage hole, wherein in the threaded component opening, an outer threaded bushing in combination with the thread bolt and the assembly locking device as described above is arranged. The second component has a threaded opening adapted in size to the thread bolt, wherein the connecting method comprises the following steps: arranging the first component and the second component opposite to each other so that the thread bolt of the first component is aligned with the second threaded opening of the second component, rotating the threaded bushing of the first component to be displace in the direction of the second component for tolerance compensation therebetween, screwing the thread bolt of the first component into the second threaded opening of the second component so that the first and the second component are connected to each other.

In order to realize tolerance compensation, the thread bolt may be rotated together with the assembly locking device so that the torque of the thread bolt may be transferred by friction to the threaded bushing for tolerance compensation between the first and the second component.

A step in the connecting method may include abutting at the second component by the threaded bushing so that the rotation of the threaded bushing may be stopped despite of further rotating the thread bolt.

BRIEF DESCRIPTION OF THE DRAWINGS

The embodiments of the present disclosure are explained in more detail with reference to the accompanying drawing. Showing.

DETAILED DESCRIPTION

Figure 2:
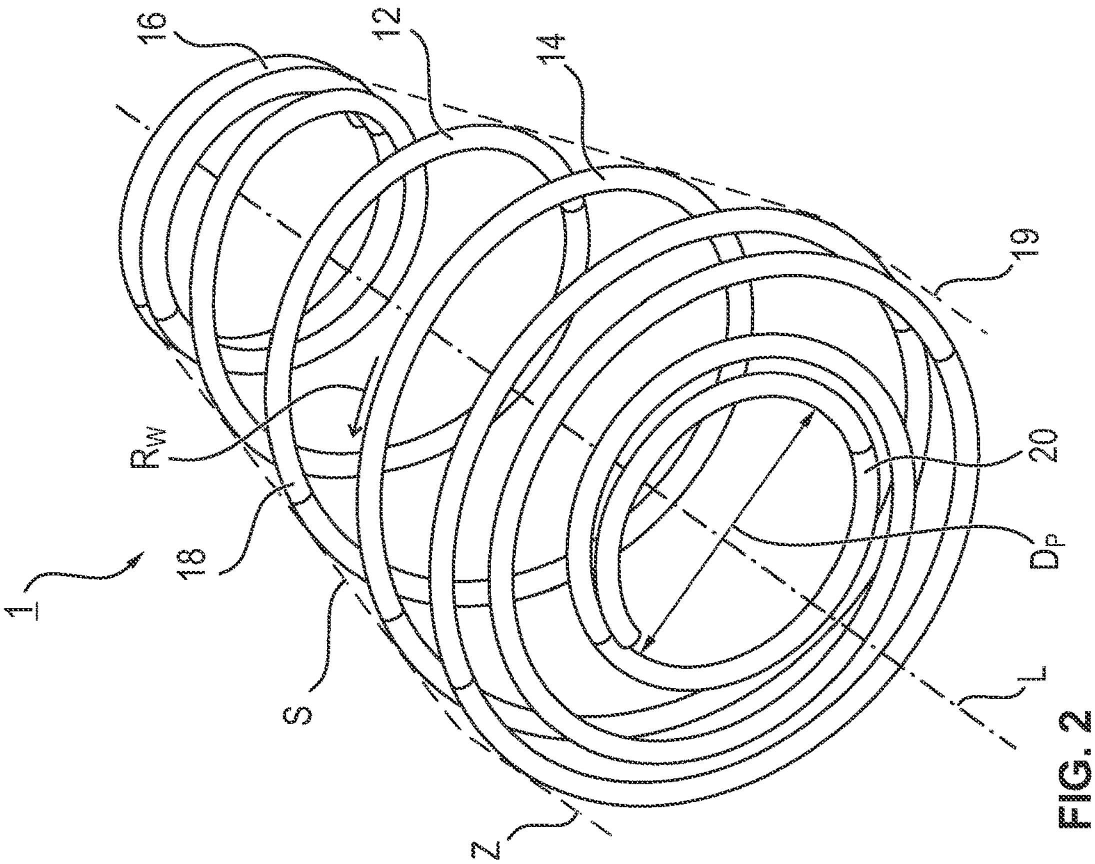
FIG. 2 a further perspective view of an embodiment of the assembly locking device, FIG. 3 a top view of an embodiment of the assembly locking device showing the tangential tang at the beginning of the holding turn, FIG. 4 a lateral perspective view of a connecting bolt in combination with the assembly locking device, FIG. 5 a lateral perspective view of a further connecting bolt in combination with the assembly locking device, FIG. 6 a lateral perspective view of a connecting bolt in combination with the assembly locking device both installed within a component opening, FIG. 7 a sectional view of a connection between a first and a second component established by means of the connecting bolt in combination with the assembly locking device, FIG. 8 a perspective view of a connecting bolt in combination with the assembly locking device and a threaded bushing for tolerance compensation installed within a component opening, FIG. 9 a perspective view of a connecting bolt in combination with the assembly locking device and a threaded bushing for tolerance compensation installed within a component opening of a first component wherein the threaded bushing is partly displaced in the direction of an opposed second component to compensate a gap or tolerance between the first and the second component, FIG. 10 a perspective view of the assembly of FIG. 9 in which the threaded bushing is partly displaced in the direction of an opposed second component to compensate a gap or tolerance between the first and the second component, and the thread bolt may be screwed in a threaded opening of the second component (schematically shown) for connecting the first and the second component to each other with tolerance compensation, FIG. 11 a flow chart of a manufacturing method of the assembly locking device, FIG. 12 a flow chart of an assembly method of an assembly locking device and a connecting bolt within a component opening, FIG. 13 a flow chart of a further assembly method of an assembly locking device, a connecting bolt and a threaded bushing for tolerance compensation within a component opening, FIG. 14 a flow chart of a connecting method of the assembly locking device, the connecting bolt in combination with the first component with a second component, and FIG. 15 a flow chart of a connecting method of the first component combined with the assembly locking device, the connecting bolt, a threaded bushing for tolerance compensation with a second component.
Figure 1:
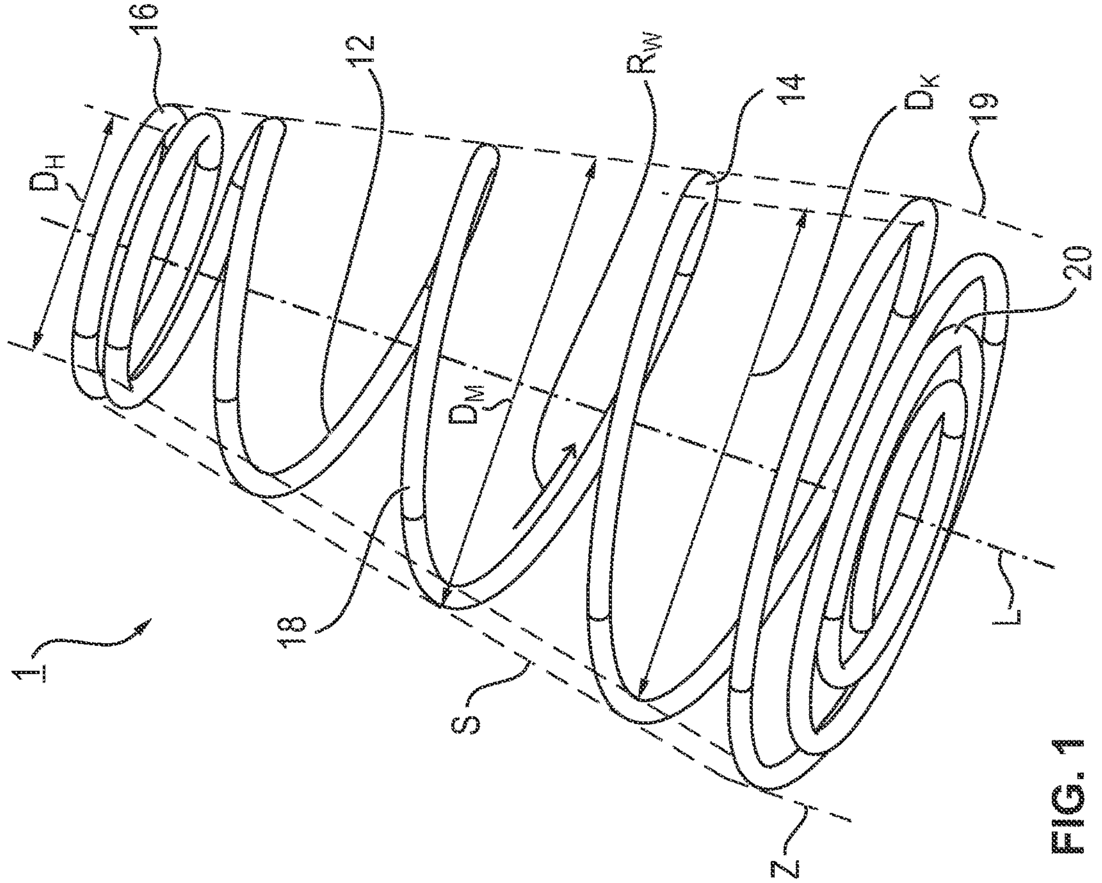
FIG. 1 a perspective view of an embodiment of the assembly locking device.

In FIGS. 1 and 2, a perspective view of an embodiment of the assembly locking device 10 is shown. The assembly locking device 10 essentially may consist of a wire coil 12 having a plurality of helically wound turns 14. The wire coil 12 has a first end and a second end.

As a general function, the assembly locking device 1 is adapted to retain itself on a shaft 32 of a connecting bolt 30, which may be a thread bolt having an outer thread on the shaft 32. To this end, the wire coil 12 provides a holding turn 16 at its first end which is described in greater detail below. The holding turn 16 is adapted in diameter to the shaft 32 of the threaded bolt 30 to realize a resilient gripping or a resilient holding of the wire coil 12 on the shaft 32, which may be adjacent to a bottom of a head 34 of the thread bolt 30.

Furthermore, the assembly locking device 1 is adapted to resiliently retain itself in a component opening 82 of a component 80 to be connected to a further component 90. To this end, the wire coil 12 has an intermediate clamping coil portion 18 which is arranged between the holding turn 16 and a positioning turn 20 (see below). Based on the truncated cone shape S of the external contour of the clamping coil 18, the assembly locking device 1 may be reduced and expanded in diameter by turning the wire coil 12 in and opposed to a turn direction of the wire coil 12.

This functionality enables a facilitated insertion or installation of the assembly locking device 1 holding a thread bolt 30 within the component opening 82. This functionality may support a self-retaining of the assembly locking device 1 holding a thread bolt 30 within the opening 82. To this end, the wire coil 12 resiliently expands after insertion into the opening 82. Thereby, at least one turn of the clamping coil portion 18 is fastened by frictional forces at an inner wall of the component 82.

As a further functionality of the construction of the assembly locking device 1, the turns of the clamping coil portion 18 may be expanded in diameter by rotation of the wire coil 12 in its turn direction $R_W$. Thereby, the turns of the clamping coil portion 18 are forced radially outwardly against the inner wall of the component opening 82 or against an inner wall of a threaded bushing 86 for tolerance compensation (see below).

Figure 3:
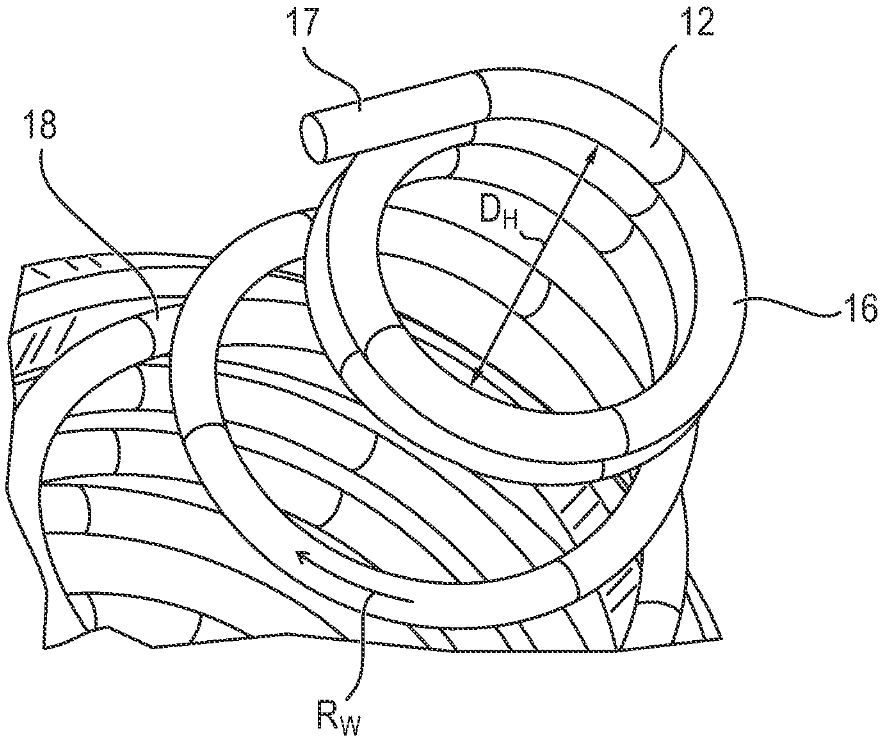

The holding turn 16 extends over an angular range of at least 360° about the central longitudinal axis L of the wire coil 12. Further, the holding turn 14 has an inner diameter $D_H$ as shown in FIGS. 1 and 3.

The holding turn 16 retains the assembly locking device 1 on the shaft 32, which may be directly below the head 34 of the thread bolt 30.

To this end, the holding turn 16 may have a smaller inner diameter as compared to the outer diameter of the shaft 32. Based thereon, the holding turn 16 is resiliently fixed on the shaft 32 below the head 34.

The clamping coil portion 18 has a plurality of subsequent turns of increasing inner diameter $D_K$ (see FIG. 1). The diameter $D_K$ increases as compared to the diameter $D_H$ of the holding turn 16.

For achieving a clamping within a component opening 82, at least two turns may be extending over 720°. Further, the clamping coil portion 18 may have a larger pitch $P_W$ as compared to the holding turn 16. The increased pitch $P_W$ realizes a larger axial distance between adjacent turns to achieve a higher radial deformability of the clamping coil portion 16.

Based on the increased pitch of the clamping coil portion 18, the clamping coil portion 18 may be qualified by a higher radial flexibility and/or elastic deformability distant from the holding turn 16 as close to the holding turn 16. Since the positioning turn 20 pre-orientates and/or loosely holds the shaft 32 in a distant from the head 34 and adjacent to the clamping coil portion 18, the positioning turn 20 benefits from the flexibility of the clamping coil portion 18 to align the shaft 32 of the connecting bolt 30.

The positioning turns 20 at the second end of the wire coil 12 extend over an angular range of at least 270° about the longitudinal axis L. Furthermore, it has an inner diameter $D_P$ for which applies $D_K > D_P \geq D_H$.

The positioning coil 20 receives the leading tip of the shaft 32 of the bolt 30. Thereby, the shaft 32 may be aligned parallel to the longitudinal axis L by the combined holding effect of the holding turn 14 and the positioning turn 20. The positioning turn 20 is intended to align the shaft 32 with the assembly locking device 1, which may be with its longitudinal axis L, and thereby also with a longitudinal axis of the component opening 82. To this end, a sufficient radial stability of the positioning turn 20 is achieved by using a smaller or no pitch $P_W$ compared to the pitch of the clamping coil portion 16.

According to further embodiments of the positioning turn 20, a last turn of the positioning turn 20 may be arranged at the end of the wire coil 12. An adjacent preceding turn has an increasing inner diameter as compared to the last turn. Further, the last turn and the preceding before last turn may be arranged in a common plane perpendicular to the longitudinal axis L. Thereby, the positioning function of the positioning turn 20 may be guaranteed.

As a further embodiment of the wire coil 12, a retaining portion 19 may be provided at the end of the clamping coil portion 18 facing the positioning turn 20. As a construction, the clamping coil portion 18 may be directly connected to the retaining portion 19 and thereby forms a bridging coil portion between the clamping coil portion 18 and the positioning turn 20.

Based on the cylindrical shape of the retaining portion 19, the retaining portion 19 may realize a frictional contact interface to an inner wall of the component opening 82. Based thereon, the retaining portion 19 additionally provides a frictionally type connection between the assembly locking device 1 and the component 80 via the inner wall of the component opening 82.

As a construction, the cylindrical retaining portion 19 may extend over an angular range of at least 270°, which may be at least 360°, about the central longitudinal axis L of the wire coil 12. At least 90% of the retaining portion 19, or 100%, contact the inner wall of the component opening 82 after pre-installation of the connecting bolt 30 within the component opening 82. The contact may be enabled by a constant minimum radius of the wire turn of the retaining portion 19 with respect to the longitudinal center middle axis L of the wire coil 12.

In order to realize a sufficient holding force of the holding turns 16 on the thread bolt 30, the holding turn 16 extends over at least 720°. With increasing angular extension of the holding turns 16, an interface between the holding turns 16 and the thread bolt 30 is increased which also increases frictional forces therebetween.

Further, adjacent windings of the holding turn 16 may be wound on block to support the stability of the holding turns 16.

Figure 4:
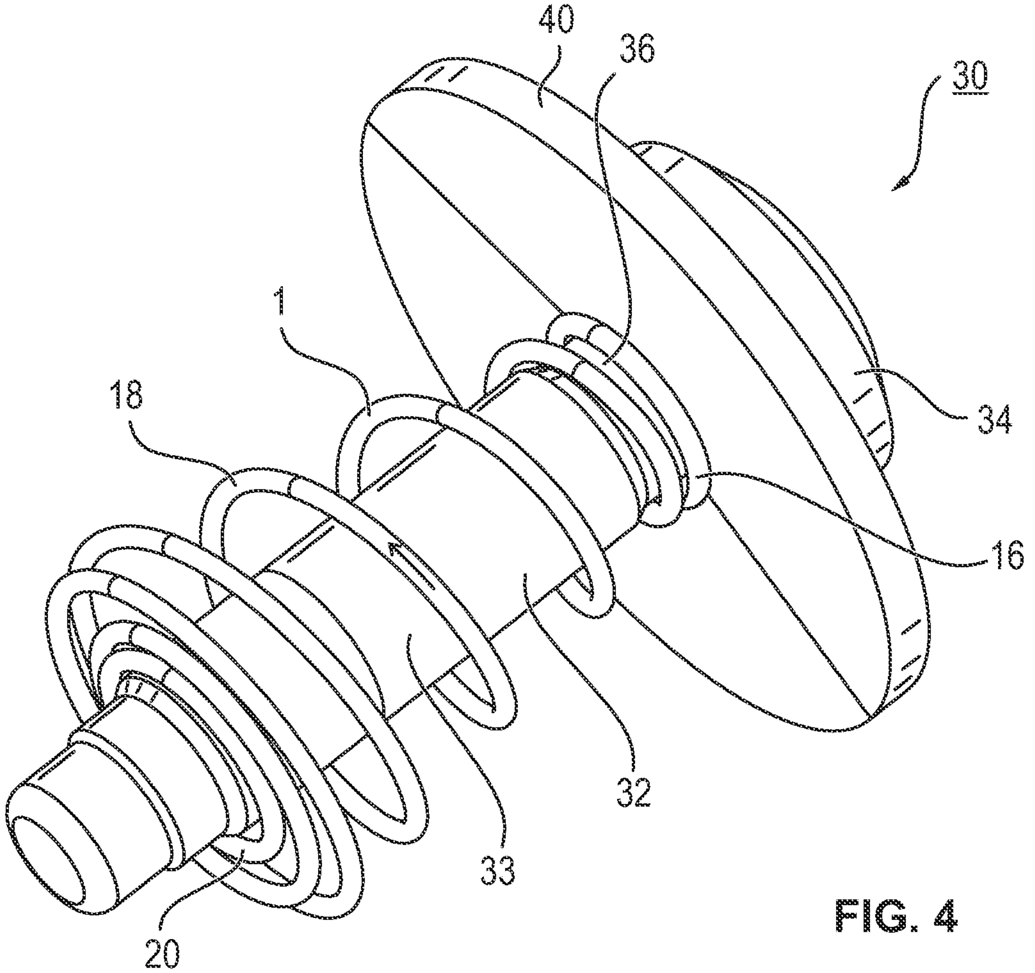
Figure 5:
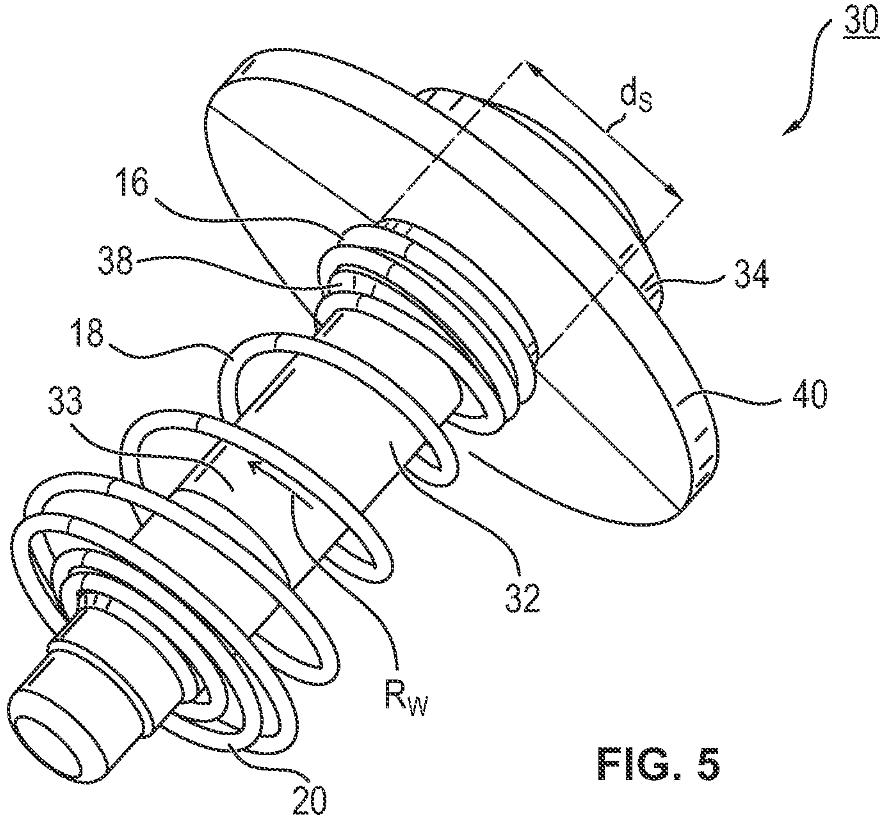

According to different embodiments, the shaft 32 may be connected to the bottom side of the head 34 based on different configurations as shown in FIGS. 4 and 5. The shaft 32 is directly connected to the bottom side of the head 34. A transition shoulder 38 or a transition groove 36 may be used for connecting the shaft 32 with the bottom side of the head 34.

The lateral extension of the transition shoulder 38 or the transition groove 36 may be in proportion to an outer thread used on the shaft 32 of the bolt 30. The present disclosure may use a standard thread on the shaft 32 which may be qualified by a core diameter according to known and accepted international standards.

The transition shoulder 38 as well as the transition groove 36 may be configured and dimensioned with respect to the core diameter $d_3$ of the standard thread used on the shaft 32. The transition shoulder 38 may have an outer diameter $d_S$ (see FIG. 5) being larger than the core diameter $d_3$. The transition groove 36 may have an outer diameter being smaller than the core diameter $d_3$.

For providing a suitable assembly locking device 1 for a thread bolt 30 having a direct combination of the shaft 32 and the head 34 or having a transition groove 36, the inner diameter $D_H$ of the holding turn 16 may be defined as follows $d_3 \geq D_H \geq 0.6 d_3$, which *may be* $d_3 \geq D_H \geq 0.65 d_3$, or $d_3 \geq D_H \geq 0.7 d_3$, or $d_3 \geq D_H \geq 0.90 d_3$ or $d_3 \geq D_H \geq 0.92 d_3$, or $d_3 \geq D_H \geq 0.95 d_3$.

If the shaft 32 is combined with the head 34 via the transition shoulder 38, the transition shoulder 38 has the outer diameter $d_S$. With respect to the core diameter $d_3$ of the thread used on the shaft 32, the outer diameter $d_S$ of the transition shoulder 38 is $1.4 d_3 \geq d_S \geq 1.05 d_3$, which *may be* $1.35 d_3 \geq d_S \geq 1.05 d_3$, or $1.3 d_3 \geq d_S \geq 1.05 d_3$, or $1.25 d_3 \geq d_S \geq 1.05 d_3$ or $1.2 d_3 \geq d_S \geq 1.05 d_3$, or $1.15 d_3 \geq d_S \geq 1.05 d_3$, or $1.1 d_3 \geq d_S \geq 1.05 d_3$.

Based thereon, the inner diameter of the holding turn $D_H$ is defined as $d_S \geq D_H \geq 0.6 d_S$, which *may be* $d_S \geq D_H \geq 0.65 d_S$, or $d_S \geq D_H \geq 0.7 d_S$, or $d_S \geq D_H \geq 0.75 d_S$, or $d_S \geq D_H > 0.8 d_S$, or $d_S \geq D_H \geq 0.85 d_S$, or $d_S \geq D_H \geq 0.90 d_S$ or $d_S \geq D_H \geq 0.92 d_S$.

The assembly locking device 1 may be adapted to be arranged on the thread bolt 30 having the bolt head 34, the thread shaft 32 and the standard thread 33 (see FIG. 4). The standard thread 16, which can be right-handed or left-handed, is a normalized standard thread RG or a normalized fine thread FG. The geometric data of the normalized standard thread 33 are defined in known DIN standards, so that the assembly locking device 1 may be provided on the basis of the normalized geometric data.

The geometric data of the normalized standard thread RG, which may be also referred to as nominal dimensions, are specified in the DIN standards DIN 13-1 and DIN 13-12. The geometric data describing the normalized standard thread RG include the nominal diameter $d_{RG}$, the pitch $P_{RG}$, the flank diameter $d_2$, $R_G$ and the core diameter $d_3$, $R_G$. These geometrical data also define a normalized fine thread FG. As an example, Table 1 shows an extract of the geometric data for the standard thread RG according to DIN 13-1. In Table 1, a portion for the nominal diameter $d_{RG}$ of $1\ mm \leq d_{RG} \leq 18\ mm$ is defined in combination with values for the pitch $P_{RG}$ in the range of $0.25\ mm \leq P_{RG} \leq 2.5\ mm$.

In addition, Table 2 shows an extract of the geometric data for the fine pitch thread FG according to DIN 13-4. Table 2 refers only to values of the nominal diameter $d_{FG}$, the flank diameter $d_{2,\ FG}$ and the core diameter $d_{3,\ FG}$ for a pitch $P_{FG}$ of 0.75 mm.

For the definition and explanation of the standard thread RG, reference is made to DIN 13-1 and DIN 13-12 and these are incorporated by this reference. The same applies to the geometric data of the fine thread FG, for which reference is made to DIN standards DIN 13-2 to DIN 13-12 and these are herewith incorporated by this reference.

TABLE 1

Geometric data for a standard thread RG of thread shaft 14 with different pitches $P_{RG}$ according to DIN 13-1 from 1999 (excerpt)

| dimensions in mm | | | | | | | | | | |
|---|---|---|---|---|---|---|---|---|---|---|
| nominal thread diameter $d_{RG}$ | | | pitch | flank diameter | core diameter | | thread depth | | curvature |
| row 1 | row 2 | row 3 | $P_{RG}$ | $d_{2,RG}$ | $d_{3,RG}$ | $D_3$ | $h_3$ | $H_1$ | $R = \frac{H}{6}$ |
| Maße in Millimeter | | | | | | | | | |
| Gewinde-Nenndurchmesser $d_{RG}$ | | | Steigung | Flanken-durchmesser | Kerndurchmesser | | Gewindetiefe | | Rundung |
| Reihe 1 | Reihe 2 | Reihe 3 | $P_{RG}$ | $d_{2,RG}$ | $d_{3,RG}$ | $D_3$ | $h_3$ | $H_1$ | $R = \frac{H}{6}$ |
| 1 | | | 0.25 | 0.838 | 0.693 | 0.729 | 0.153 | 0.135 | 0.036 |
| | 1.1 | | 0.25 | 0.938 | 0.793 | 0.829 | 0.153 | 0.135 | 0.036 |
| 1.2 | | | 0.25 | 1.038 | 0.893 | 0.929 | 0.153 | 0.135 | 0.036 |
| | 1.4 | | 0.3 | 1.205 | 1.032 | 1.075 | 0.184 | 0.162 | 0.043 |

TABLE 1-continued

| Geometric data for a standard thread RG of thread shaft 14 with different pitches $P_{RG}$ according to DIN 13-1 from 1999 (excerpt) | | | | | | | | | |
|---|---|---|---|---|---|---|---|---|---|
| 1.6 | | | 0.35 | 1.373 | 1.171 | 1.221 | 0.215 | 0.189 | 0.051 |
| | 1.8 | | 0.35 | 1.573 | 1.371 | 1.421 | 0.215 | 0.189 | 0.051 |
| 2 | | | 0.4 | 1.740 | 1.509 | 1.567 | 0.245 | 0.217 | 0.058 |
| | 2.2 | | 0.45 | 1.908 | 1.648 | 1.713 | 0.276 | 0.244 | 0.065 |
| 2.5 | | | 0.45 | 2.208 | 1.948 | 2.013 | 0.276 | 0.244 | 0.065 |
| 3 | | | 0.5 | 2.675 | 2.387 | 2.459 | 0.307 | 0.271 | 0.072 |
| | 3.5 | | 0.6 | 3.110 | 2.764 | 2.850 | 0.368 | 0.325 | 0.087 |
| 4 | | | 0.7 | 3.545 | 3.141 | 3.242 | 0.429 | 0.379 | 0.101 |
| | 4.5 | | 0.75 | 4.013 | 3.580 | 3.688 | 0.460 | 0.406 | 0.108 |
| 5 | | | 0.8 | 4.480 | 4.019 | 4.134 | 0.491 | 0.433 | 0.115 |
| 6 | | | 1 | 5.350 | 4.773 | 4.917 | 0.613 | 0.541 | 0.144 |
| | 7 | | 1 | 6.350 | 5.773 | 5.917 | 0.613 | 0.541 | 0.144 |
| 8 | | | 1.25 | 7.188 | 6.466 | 6.647 | 0.767 | 0.677 | 0.180 |
| | | 9 | 1.25 | 8.188 | 7.466 | 7.647 | 0.767 | 0.677 | 0.180 |
| 10 | | | 1.5 | 9.026 | 8.160 | 8.376 | 0.920 | 0.812 | 0.217 |
| | | 11 | 1.5 | 10.026 | 9.160 | 9.376 | 0.920 | 0.812 | 0.217 |
| 12 | | | 1.75 | 10.863 | 9.853 | 10.106 | 1.074 | 0.947 | 0.253 |
| | 14 | | 2 | 12.701 | 11.546 | 11.835 | 1.227 | 1.083 | 0.289 |
| 16 | | | 2 | 14.701 | 13.546 | 13.835 | 1.227 | 1.083 | 0.289 |
| | 18 | | 2.5 | 16.376 | 14.933 | 15.294 | 1.534 | 1.353 | 0.361 |

TABLE 2

| Geometric data for a fine thread FG of thread shaft 14 with pitch $P_{FG}$ = 0.75 mm according to DIN 13-4 from 1999 (excerpt) | | | | | | |
|---|---|---|---|---|---|---|
| dimensions in mm | | | | | | |
| nominal thread diameter $d_{FG}$ | | | | flank diameter | core diameter | |
| row 1 | row 2 | row 3 | row 4 | $d_{2,FG}$ | $d_{3,FG}$ | $D_1$ |
| Maße in Millimeter | | | | | | |
| Gewinde-Nenndurchmesser $d_{FG}$ | | | | Flankendurchmesser | Kerndurchmesser | |
| Reihe 1 | Reihe 2 | Reihe 3 | Reihe 4 | $d_{2,FG}$ | $d_{3,FG}$ | $D_1$ |
| 5 | | 5.5 | | 4.513 | 4.080 | 4.188 |
| 6 | | | | 5.013 | 4.580 | 4.688 |
| | | | | 5.513 | 5.080 | 5.188 |
| | 7 | 6.5 | | 6.013 | 5.580 | 5.688 |
| | | 7.5 | | 6.513 | 6.080 | 6.188 |
| | | | | 7.013 | 6.580 | 6.688 |
| 8 | | 8.5 | | 7.513 | 7.080 | 7.188 |
| | | 9 | | 8.013 | 7.580 | 7.688 |
| | | | | 8.513 | 8.080 | 8.188 |
| 10 | | 9.5 | | 9.013 | 8.580 | 8.688 |
| | | 10.5 | | 9.513 | 9.080 | 9.188 |
| | | | | 10.013 | 9.580 | 9.688 |
| 12 | | 11 | | 10.513 | 10.080 | 10.188 |
| | | 11.5 | | 11.013 | 10.580 | 10.688 |
| | | | | 11.513 | 11.080 | 11.188 |
| | | 12.5 | | 12.013 | 11.580 | 11.688 |
| | | 13 | | 12.513 | 12.080 | 12.188 |
| | | 13.5 | | 13.013 | 12.580 | 12.688 |
| | 14 | 14.5 | | 13.513 | 13.080 | 13.188 |
| | | 15 | | 14.013 | 13.580 | 13.688 |
| | | | | 14.513 | 14.080 | 14.188 |
| 16 | 18 | 17 | | 15.513 | 15.080 | 15.188 |
| | | | | 16.513 | 16.080 | 16.188 |
| | | | | 17.513 | 17.080 | 17.188 |

The wire from which the assembly locking device 1 is wound may comprise a round cross-section, as shown in FIGS. 1 to 3. A wire with an elliptical cross-section or a rhombic cross-section or a cross-section rounded on one side may be used. The different cross-sectional shapes are used in dependence thereon to increase a retention of the assembly locking device 1 on the thread 33 of the thread bolt 30 or on an inner component wall.

The wire of the assembly locking device may be comprised of a spring-elastic material with sufficient tensile strength either made of metal or of plastic material.

The spring wire or the plastic wire of the wire coil 12 may have a thickness in the range of 0.3 mm to 1.7 mm.

According to a further embodiment of the assembly locking device 1, the holding turn 16 starts at the first end of the wire coil 12 with a tangentially extending tang 17. This construction may realize a distance between the thread 33 on the shaft 32 and sharp edges or burr at the cut first end of the wire coil 12. The wire coil 12 is wound from an endless wire. Thus, each wire forming a wire coil 12 has to be cut from the endless wire. The cutting process generates sharp edges or burr which leads to damage of the thread 33 on the shaft 32. Therefore, the tangential tang 17 realizes a protecting distance of the cut wire end to the thread 33 of the thread bolt 30.

As already mentioned above, the clamping coil portion 18 may have a truncated cone shape in its outer of contour. It is such oriented that the smallest extension of the clamping coil portion 18 is adjacent to the holding turn 16. Starting from this position, the clamping coil portion 18 may expand continuously in its diameter in the direction of the positioning turn 20. Close to the positioning turn 20, it has the largest radial extension.

The holding turn 16 retains the thread bolt 13 in the center of the assembly locking device 1. The clamping coil 18 is adapted to be forced into component openings of different size and/or shape to retain therein the assembly locking device 1 and thereby the thread bolt 30 asserted by frictional forces. The resiliently deformable wire of the wire coil 12 enables the clamping coil portion 16 to be adapted to different shapes and sizes of the component opening 82. After elastic deformation of the clamping coil portion 18, e. g. after insertion into the component opening 82 being smaller in diameter than the clamping coil portion 16, the clamping coil portion 16 attempts to return to its original shape. This intrinsic effort of the clamping coil portion 18 generates the clamping frictional forces between the clamping coil portion 18 and the inner wall of the component opening 82.

According to an embodiment, the inner diameter $D_K$ of the clamping coil portion 18 is $$D_H<D_K<10D_H, \text{ or } 1.5D_H<D_K<8D_H$$

Based on the shape of the clamping coil portion 18, the clamping coil portion 18 provides a plurality of increasing inner diameters $D_K$ based on the plurality of turns forming the clamping coil portion 18. Each single turn may be sufficient to resiliently retain the assembly locking device 1 with the thread bolt 30 within the opening 82.

Thus, a spheric outer contour for providing the clamping coil portion 18 may be used. In this context, the holding turn 16 and the positioning turn 20 would form the poles of the spheric assembly locking device 1 which are connected by the longitudinal axis L.

Based on the above described construction of the assembly locking device 1, the thread bolt 30 having a standard thread 33 is assembled with the assembly locking device 1 as exemplarily shown in FIGS. 4 and 5. The thread bolt 30 of FIG. 4 comprises the transition groove 36. The transition groove 36 may have a certain depth measured perpendicular to the longitudinal axis L. The depth of the transition groove 36 may be reduced to zero.

FIG. 5 shows a thread bolt 30 comprising the transition shoulder 38. The inner diameter $D_H$ of the holding turn 16 is adapted to the size $D_S$ of the transition shoulder 38.

By means of the holding turn 16, the assembly locking device 1 is mounted in the loss proof manner on the thread bolt 30 having the transition groove 36 or the transition shoulder 38.

In order to guarantee that the clamping coil portion 18 may retain the assembly locking device 1 in combination with the thread bolt 30 within the component opening 82, it has an outer diameter of $D_M$ in the range of $$40d_3 \geq D_M \geq 2d_3, \text{ which } \textit{may be } 35d_3 \geq D_M \geq 2d_3, \text{ or } 30d_3 \geq D_M \geq 2d_3, \text{ or } 25d_3 \geq D_M \geq 2d_3, \text{ or}$$

$$20d_3 \geq D_M \geq 2d_3, \text{ or } 15d_3 \geq D_M \geq 2d_3 \text{ (\textit{see} FIGS. 1 and 6).}$$

Figure 6:
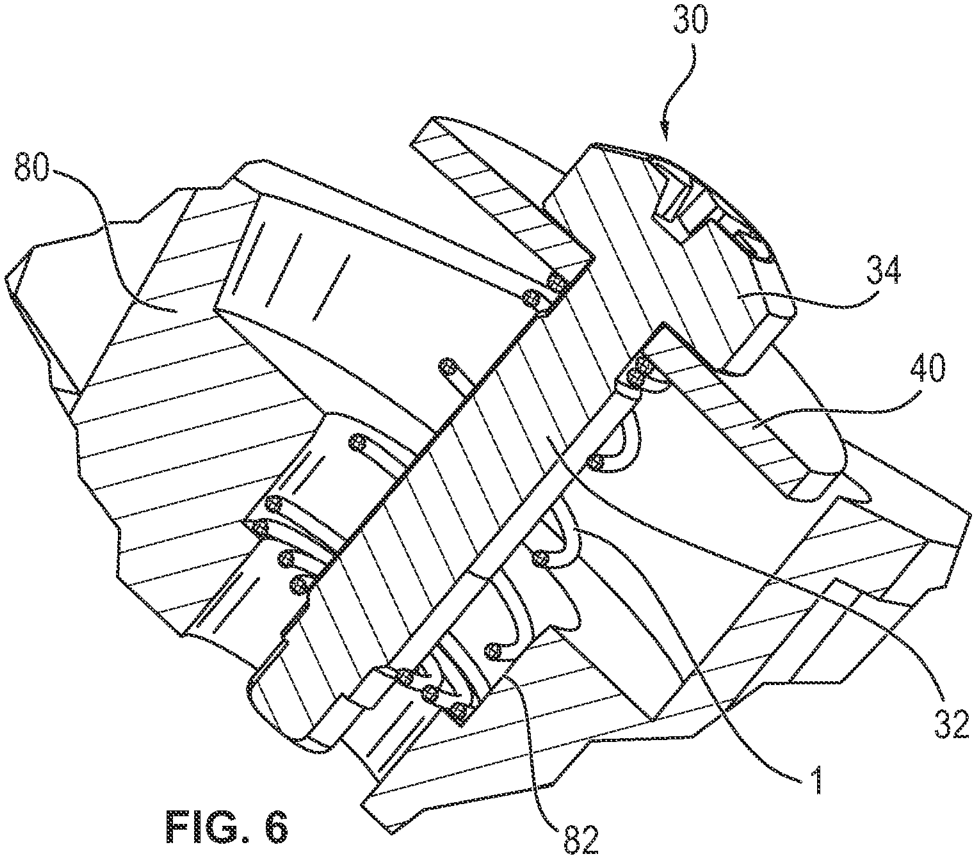

As illustrated in FIG. 6, the component opening 82 is a stepped through hole. A component 80 may be provided having a straight through hole to preinstall and retain the assembly locking device 1 in combination with the thread bolt 30.

As shown in FIGS. 1 to 5, the assembly locking device 1 has a turn direction $R_W$. The wire coil 12 may start at the holding turn 16 and it regularly runs down an axial direction to the positioning turned 20. For pre-installing the thread bolt 30 together with the assembly locking device 1 in the component opening 82, a relative rotation between the component opening 82 and the thread bolt 13 is made in opposite direction to the turn direction $R_W$. In other words, the thread bolt 30 may be turned against the turn direction $R_W$. The holding turn 16 fastens the wire coil 12 on the shaft 32. The wire coil 12 is wound closer or tighter to the shaft 32 by turning the shaft 32 against the turn direction $R_W$ and by frictionally holding or slowing down the clamping coil portion 18 at the inner wall of the component opening 82. Thereby, the preinstallation in the component opening 82 is facilitated.

After the pre-installation position of the assembly locking device 1 with thread bolt 30 is reached within the component opening 82, the thread bolt 30 still holding the assembly locking device 1 is turned in turn direction $R_W$ to enlarge the diameter $D_M$ of the clamping coil portion 18. Thereby, frictional forces between the clamping coil portion 18 and the inner wall of the component opening 82 are increased and retain the assembly locking device 1 with the thread bolt 30 within the component opening 82.

Figure 7:
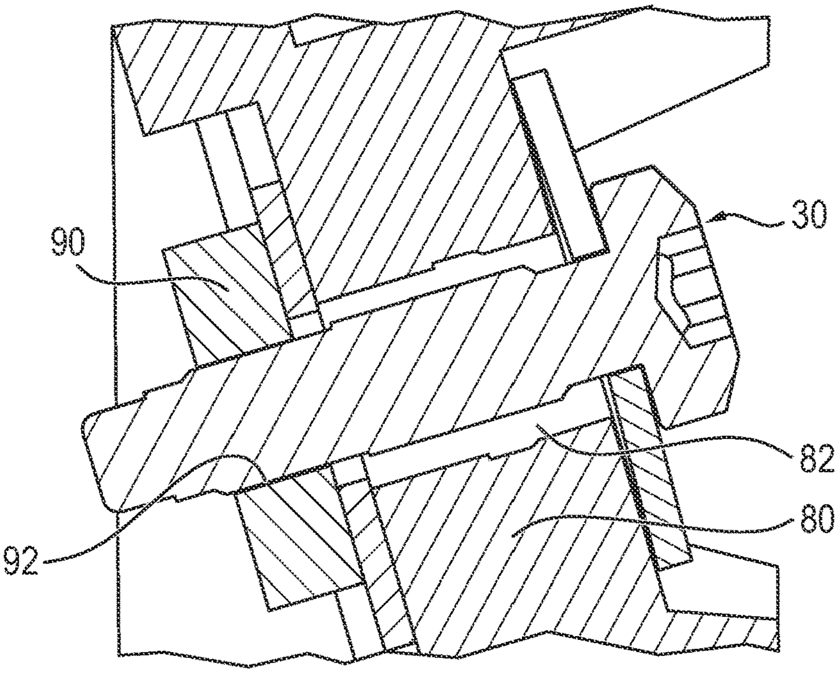

From the above described position, the thread bolt 30 may be screwed in a threaded opening 92 of the second component 90 (see FIG. 7). To this end, the second component 90 is placed opposed to the first component 80 so that the thread bolt 30 and the threaded opening 92 are co-axially aligned to each other.

The threaded opening 92 may be formed by an inner thread of an opening, by a blind rivet nut, by nut, by a weld nut or the like of the second component 90.

Figure 8:
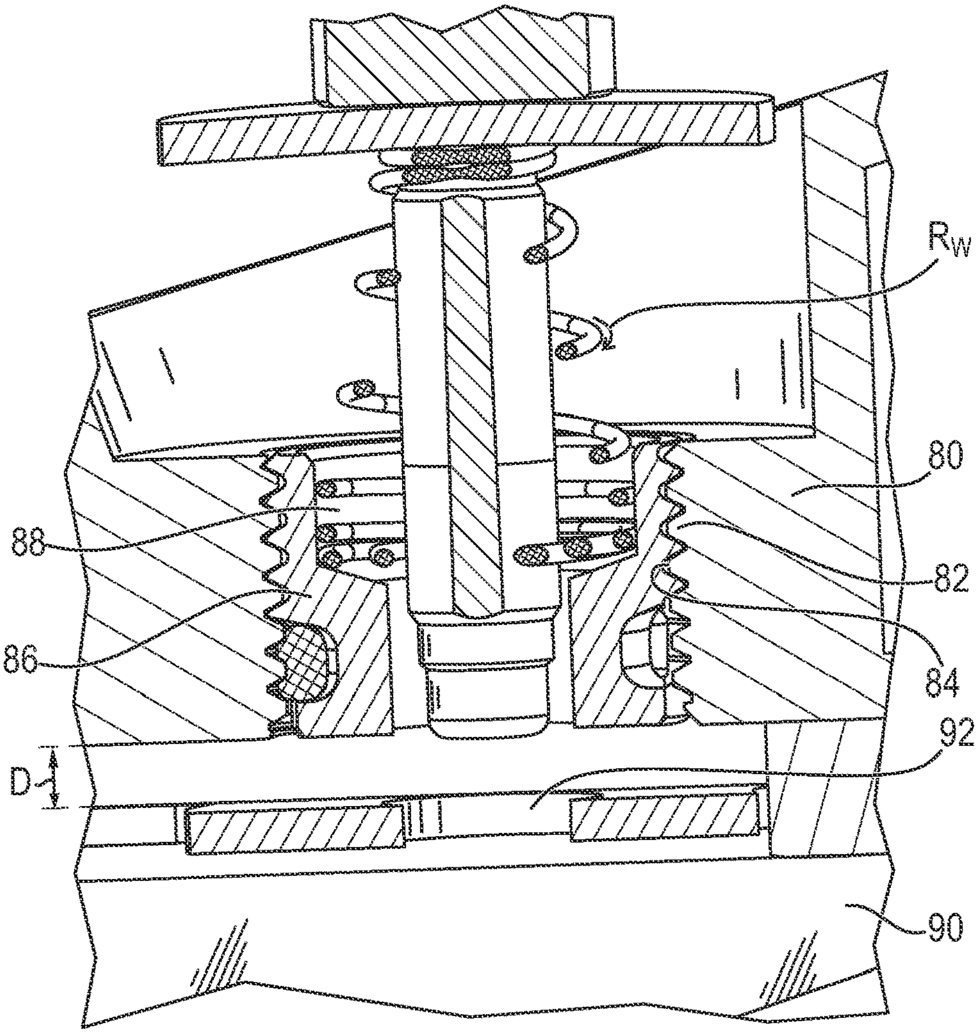

According to a further embodiment, the clamping coil portion 18 may be preinstalled (as described above) in an inner opening 88 of an outer threaded bushing 86 (see FIG. 8).

The combination of the assembly locking device 1, the threaded bolt 30 and the preinstalled threaded bushing 86 may be used as a unit for tolerance compensation between a first part 80 and second part 90.

To this end, the component opening 82 of the first component 80 may comprise an inner thread 84 adapted to the outer thread of the outer threaded bushing 86.

The unit comprising the assembly locking device bond, the thread bolt 30, and the threaded bushing 86 may be provided separately to the first component 80 or preinstalled in the opening 82 of the first component 80 as shown in FIG. 8.

The threaded bushing 86 installed in the component opening 82 serves for bridging a distance D between the first component 80 and a second component 90. To this end, the bushing 86 is rotated to be displaced in the direction of the second component 90. As soon the bushing 86 abuts at the second component 90, the rotation of the bushing 86 is stopped. Thereafter, this thread bolt 30 is screwed in the threaded opening 92 of the second component 90 so that first 80 and second component 90 are fixed to each other.

For rotating and displacing the outer threaded bushing 86, the thread bolt 30 holding the assembly locking device 1 may be turned in turn direction $R_W$ of the wire coil 12. Based on the friction between the inner wall of the inner opening 88 of the bushing 86 and the clamping coil portion 18, the rotation of the thread bolt 30 tries to enlarge the outer diameter $D_M$ of the clamping coil portion 18. Thereby, the friction is increased between the inner wall of the inner opening 88 and the clamping coil portion 18. This may allow the thread bolt 30 to rotate the bushing 86.

Based on the configuration shown in FIG. 8, the thread bolt 30 turns the bushing 86 in a clockwise direction as the turn direction $R_W$ is running, if seen from the bolt head 34.

To displace the bushing 86 to the second component 90, the inner thread 84 of the first component 18 as well as of the bushing 86 may be left-handed. If the turn direction $R_W$ is anticlockwise, the inner thread 84 and the thread of the outer threaded bushing 86 are right-handed. The thread direction of the thread bolt 30 may be equal to the turn direction $R_W$.

Figure 9:
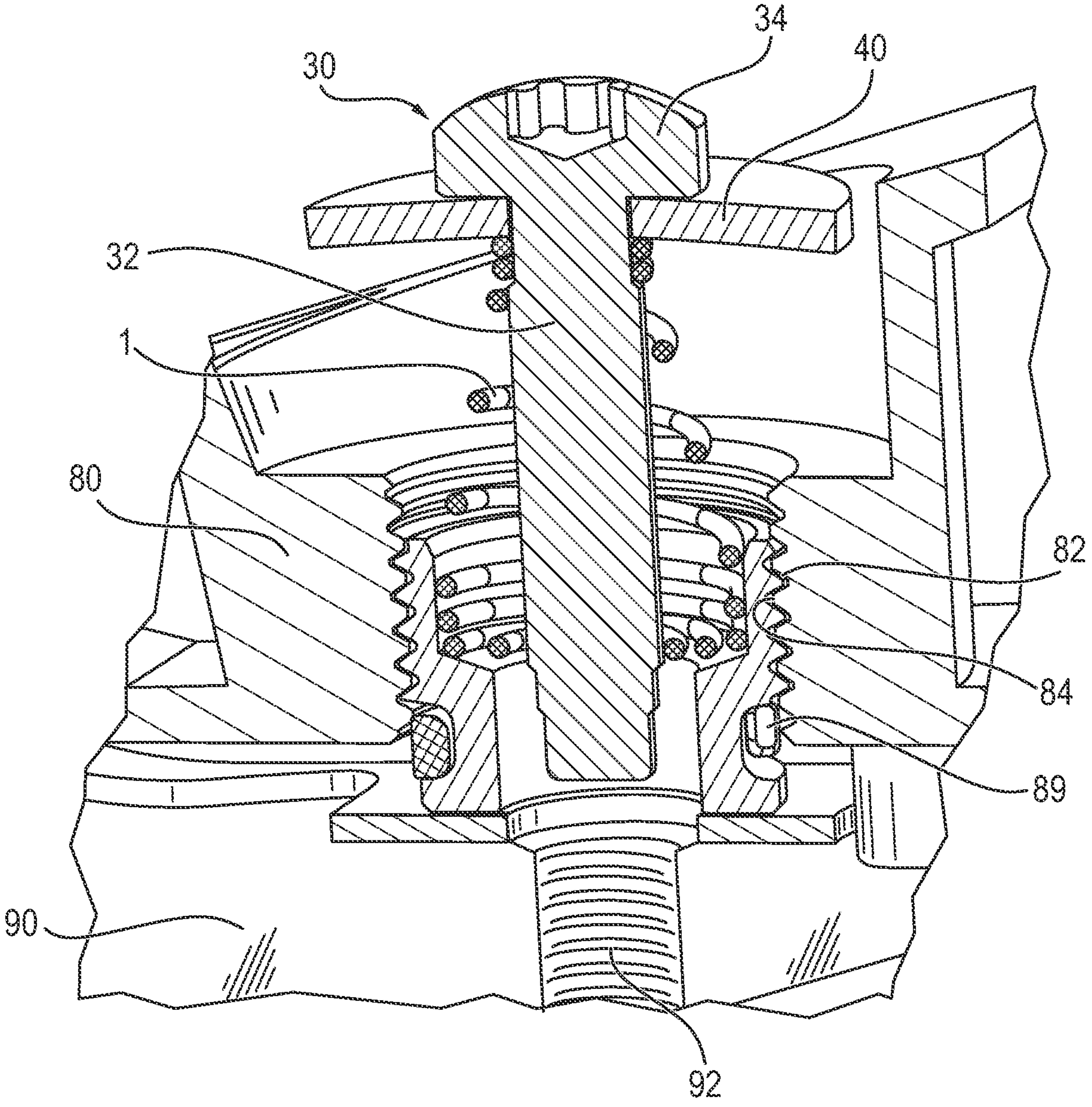
Figure 10:
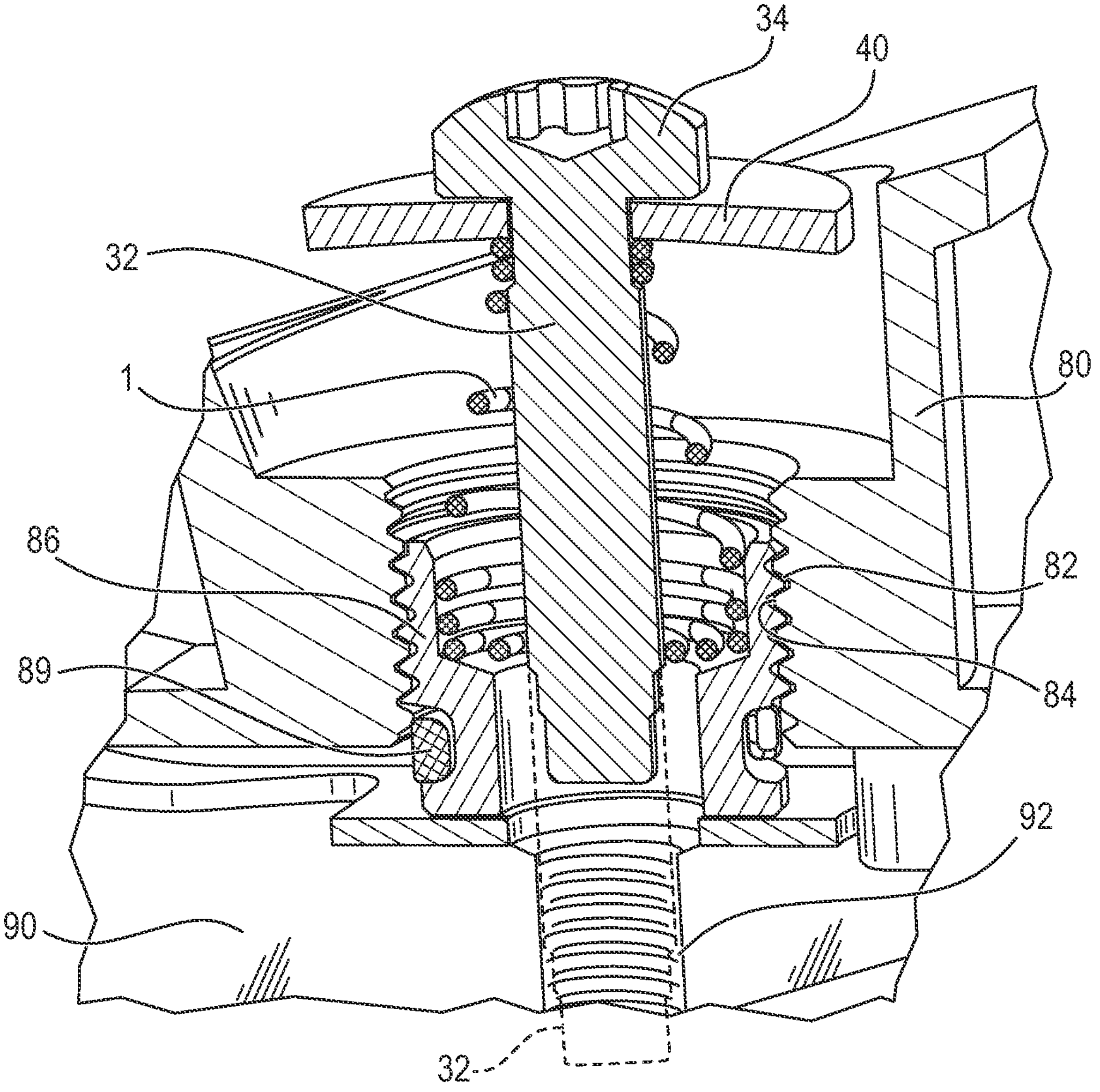
Figure 11:
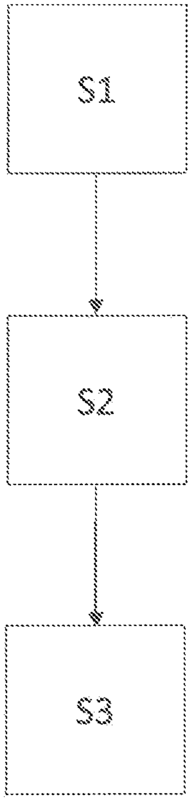

As soon as the threaded bushing 86 abuts the second component 90 (see FIG. 9), further rotation and displacement of the bushing 86 is stopped. Thereafter, the thread bolt 30 is screwed into the threaded opening 92 of the second component to fasten the first 80 and the second component 92 to each other (see FIG. 10 as schematically shown by the dashed line illustrating the thread bolt 30 screwed in the second component 90).

Referring to FIG. 8, the inner opening 88 of the threaded bushing 86 has a stepped configuration with respect to its longitudinal axis. In fastening direction of the thread bolt 30, the inner opening 88 has a larger diameter in the first starting section and a smaller diameter in a subsequent section. This axially stepped configuration may guarantee that the assembly locking device 1 and the clamping quarry portion 18 is sufficiently received in the inner opening 88. Based on the installation of the clamping quarry portion 18 within the inner opening 88, the clamping coil portion 18 may realize frictional anchoring, and thereby connection between the clamping quarry portion 18 and the threaded bushing 86.

Referring to the stepped configuration of the component opening 82 (see FIG. 6), the thread bolt 30 is reliably pre-installed thereby. Furthermore, the stepped configuration prevents that the assembly locking device 1 is pushed through the opening 82 with no fastening of the assembly locking device 1.

Referring to the stepped configuration of the inner opening 88 of the outer threaded bushing 86, the assembly locking device 1 cannot be pushed through the opening 88. Furthermore, the frictional connection between the thread bolt 30 and the threaded bushing 86 by means of the assembly locking device 1 guarantees a torque transfer from the thread bolt 30 to the threaded bushing 86. Thereby, the threaded bushing 86 is used for tolerance compensation. Furthermore, the thread bolt 30 may be kept within the opening 88 until the outer threaded bushing 86 abuts the second component 90.

Thereafter, the thread bolt 30 is screwed in the threaded opening 92 of the second component 90.

The threaded bushing 86 may have a friction ring 89 arranged on the outer thread of the bushing 86. The friction ring 89, which may be made of elastic material, may have contact to the inner thread 84 of the component opening 82. Based on this arrangement, the friction ring 89 prevents a release of the threaded bushing 86 by vibration and/or during transport.

The first component 18 may be provided with a preinstalled thread bushing 86 in combination with the assembly locking device 1 and the thread bolt 30. This pre-installed assembly is also bound together by means of the friction ring 89 during transport.

In the following, the above described methods are summarized presenting their essential steps.

Figure 12:
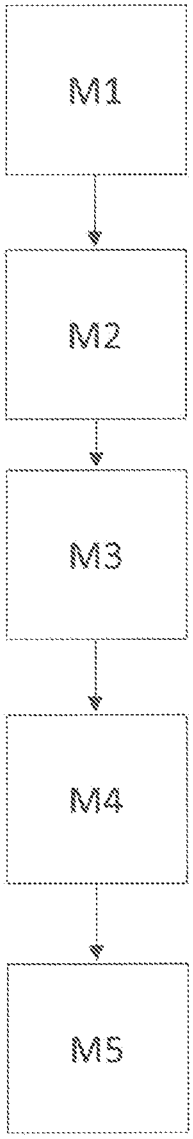
Figure 13:
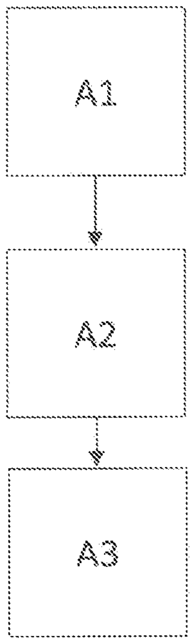
Figure 14:
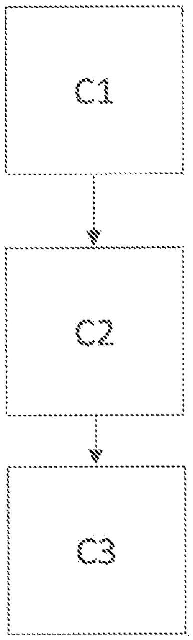
Figure 15:
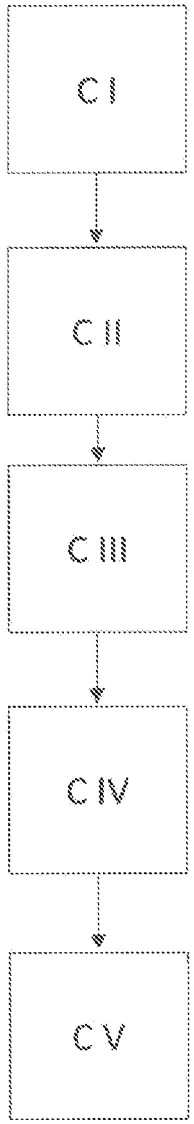

The assembly method refers to the thread bolt 30 having a direct connection between the shaft 32 and the head 34 or having the transition groove 36 or the transition shoulder 38 arranged therebetween. Said thread bolt 30 is arranged within the component opening 82 of the first component 80 to be connected to the second component 90. With reference to FIG. 12, the assembly method comprises the steps: axially moving (step M1) the connecting bolt 30 with assembly locking device 1 in the direction of the central longitudinal axis L into the component opening 82 of the component 80, during the axially moving of the connecting bolt with assembly locking device 1 into the component opening 82 of the component, generating a relative rotation (step M2) between the component opening 82 and the connecting bolt 30 with assembly locking device 1, so that the assembly locking device 1 decreases an outer diameter of the clamping coil portion 18 within the component opening 82, stopping the axial moving (step M3) of the connecting bolt with assembly locking device 1 into the component opening 82 of the component and generating a contrary relative rotation (step M4) compared with step M2, so that the assembly locking device 1 increases the outer diameter of the clamping coil portion 18 within the component opening 82 and retains the connecting bolt 30 in the component opening 82 in a releasable manner.

An alternative assembly method is directed to pre-installing the above described thread bolt 30 in the inner opening 88 of the outer threaded bushing 88 arranged within the component opening 82 having an inner thread. The assembly method comprises the steps: axially moving (step M1) the connecting bolt with assembly locking device 1 in the direction of the central longitudinal axis into an inner opening 88 of the outer threaded bushing 86 arranged within the component opening 82 of the component, during the axially moving of the connecting bolt 30 with assembly locking device 1 into the inner opening 88 of the threaded bushing 86, generating a relative rotation (step M2) between the inner opening 88 and the connecting bolt with assembly locking device 1, so that the assembly locking device 1 decreases an outer diameter of the clamping coil portion 18 within the inner opening 88, stopping the axial moving (step M3) of the connecting bolt with assembly locking device 1 into the inner opening 88 of the threaded bushing 86 and generating a contrary relative rotation (step M4) compared with step M2, so that the assembly locking device 1 increases the outer diameter of the clamping coil portion 18 within the inner opening 88 and retains the connecting bolt in the inner opening 88 in a releasable manner.

According to different embodiments of the above described assembly methods, the following measure may be carried out in step M2: rotating the thread bolt 30 with assembly locking device 1 in turn direction $R_W$ of the assembly locking device 1 while the assembly locking device 1 is fixedly held by means of the holding turn 14 on the connecting bolt, so that the outer diameter of the clamping coil portion 18 decreases.

Further in step M3: rotating the thread bolt 30 with assembly locking device 1 contrary to the turn direction $R_W$ of the assembly locking device 1 while the assembly locking device 1 is fixedly held on the connecting bolt by means of the holding turn 14 so that the outer diameter of the clamping coil portion 18 increases.

Furthermore, an assembly method was described referring to the thread bolt 30 pre-installed in the threaded bushing 86. This combination is assembled in the component opening 82 having the inner thread. It comprises the steps: axially moving (step M1) the connecting bolt with assembly locking device 1 and the threaded bushing in the direction of the central longitudinal axis into the component opening 82 of the component, during the axially moving of the connecting bolt with assembly locking device 1 and the threaded bushing into the component opening 82 of the component, generating a relative rotation (step M2) between the component opening 82 and the connecting bolt with assembly locking device 1 and the threaded bushing, so that the threaded bushing 86 is screwed in the threaded component opening 82, stopping the axial moving (step M3) of the connecting bolt with assembly locking device 1 and the threaded bushing into the component opening 82 of the component.

For connecting the first component 80 to the second component 90, the connecting method was described. To this end, the first component has the component opening 82 being provided as a passage hole and the second component 90 has the second threaded opening adapted to the thread bolt 30. For connecting, the following steps may be carried out: arranging the first component and the second component opposite to each other so that the thread bolt 30 of the first component is aligned with the second threaded opening of the second component, compressing the axial locking device 1 in an axial direction of the thread bolt 30 thereby introducing a tip of the thread bolt 30 into the threaded opening of the second component, screwing the thread bolt 30 of the first component into the threaded opening of the second component so that the first and the second component are connected to each other.

An alternatively described connecting method is directed to the combination/connection of the first component 80 having the first threaded component opening 82 in combination with the pre-installed outer threaded bushing 86 in combination with the thread bolt 30 and the assembly locking device 1. The connection method comprises the following steps: arranging the first component and the second component opposite to each other so that the thread bolt 30 of the first component is aligned with the second threaded opening of the second component, rotating the threaded bushing of the first component to be displace in the direction of the second component for tolerance compensation therebetween, screwing the thread bolt 30 of the first component into the second threaded opening of the second component so that the first and the second component are connected to each other.

According to different embodiments of the above connecting method, it comprises the further step: rotating the thread bolt 30 together with the assembly locking device 1 so that the torque of the thread bolt 30 is transferred by friction to the threaded bushing for tolerance compensation between the first and the second component.

It comprises the further step: abutting at the second component by the threaded bushing so that the rotation of the threaded bushing may be stopped despite of further rotating the thread bolt 30.

The above described assembly locking device 1 may be manufactured based on the following method steps: winding the wire to form the wire coil 12 consisting of a plurality of screw-like wound windings of the wire, having a first and a second end, wherein starting (S1) at the first end of the wire coil 12, the holding turn 14 is provided which extends over an angular range of at least 360° about the central longitudinal axis L of the wire coil 12 and comprises an inner diameter $D_H$, following the holding turn 14, the clamping coil portion 18 is arranged (S2) that is formed like the truncated cone having the plurality of subsequent turns of an increasing inner diameter $D_K$ compared with the holding turn 14, with the clamping coil portion 18 extending over at least two turns about the central longitudinal axis L of the wire coil and comprises a pitch $P_W$ that is larger compared with the holding turn 14, and following the clamping coil portion 18 and at the end of the second end of the wire coil 12, the positioning turn is provided (S3), extending over the angular range of at least 2700 about the central longitudinal axis L of the wire coil 12, having an inner diameter $D_P$ for which $D_K > D_P \geq D_H$ applies, and having a smaller or no pitch $P_P$ compared with the clamping coil portion 18, so that the end of the shaft 32, facing away from the head 34, of the thread bolt 30 is receivable in the positioning turn 20 and the thread bolt 30 is holdable aligned in the component opening 82 in a clamping manner by means of the holding turn 14 and the positioning turn 20.

The invention claimed is:

1. An assembly locking device adapted to a shaft of a connecting bolt with a bolt head so that the assembly locking device is positionable on the shaft in a loss-proof manner and the connecting bolt is arrangeable in a pull-out-proof manner inserted into a component opening with the help of the assembly locking device, wherein the assembly locking device includes the following features:

a. a wire coil comprised of a plurality of helically wound turns, the wire coil having a first end and a second end,
b. starting at the first end of the wire coil, a holding turn is provided which extends over an angular range of at least 360° about a central longitudinal axis of the wire coil and comprises an inner diameter $D_H$,
c. following the holding turn, a clamping coil portion is arranged that is formed like a truncated cone having a plurality of subsequent turns of an increasing inner diameter $D_K$ compared with the holding turn, with the clamping coil portion extending over at least two turns about the central longitudinal axis of the wire coil and comprises a pitch $P_W$ that is larger compared with the holding turn, and
d. following the clamping coil portion and at the second end of the wire coil, a positioning turn is provided,
  d1. extending over an angular range of at least 270° about the central longitudinal axis of the wire coil,
  d2. having an inner diameter $D_P$ for which $D_K > D_P \geq D_H$ applies, and
  d3. having a smaller or no pitch $P_P$ compared with the clamping coil portion, so that
  d4. an end of the shaft, facing away from the head, of the connecting bolt is receivable in the positioning turn and the connecting bolt is holdable aligned in the component opening in a clamping manner by means of the holding turn and the positioning turn.

2. The assembly locking device according to claim 1 in which the connecting bolt is a thread bolt, and the inner diameter $D_H$ of the holding turn is adapted to an outer thread on the shaft of the thread bolt such that the following applies $$d_3 \geq D_H \geq 0.6\ d_3,$$

wherein $d_3$ denotes a core diameter of a standard thread on the shaft.

3. The assembly locking device according to claim 1, in which the connecting bolt is a thread bolt, and the inner diameter $D_H$ of the holding turn is adapted to an outer diameter $d_s$ of a transition shoulder between the bolt shaft and the bolt head wherein the outer diameter $d_s$ of the transition shoulder is $$1.4\ d_3 \geq d_s \geq 1.05\ d_3, \text{ and}$$

the following applies for the inner diameter $D_H$ of the holding turn $$d_s \geq D_H \geq 0.6\ d_s,$$

wherein $d_3$ denotes a core diameter of a standard outer thread on the shaft.

4. The assembly locking device according to claim 1, wherein a cylindrical retaining portion is provided between the clamping coil portion and the positioning turn adapted to retain the assembly locking device within the component opening wherein the cylindrical retaining portion extends over an angular range of at least 270° about the central longitudinal axis of the wire coil.

5. The assembly locking device according to claim 1 in which the holding turn extends over at least 720° and windings of the holding turn, which are adjacent to one another, are wound on block.

6. The assembly locking device according to claim 1 in which a last turn of the positioning turn is arranged at the end of the wire coil with an adjacent turn of an increasing inner diameter in a common plane perpendicular to the central longitudinal axis of the wire coil.

7. A thread bolt with a shaft and a bolt head wherein the shaft comprises a thread as well as the assembly locking device according to claim 1 which is held in a loss-proof manner on the shaft by means of the holding turn adjacent to the bolt head.

8. The thread bolt according to claim 7 on which the thread is defined as a normalized standard thread RG or a normalized fine thread FG on the shaft by the normalized nominal diameter $d_3$ and the shaft has, in combination with the assembly locking device, an outer diameter $D_M$ from the range $$40\ d_3 \geq D_M \geq 2\ d_3$$

so as to hold the thread bolt in a loss-proof manner in the component opening.

9. The thread bolt according to claim 7, wherein a) the clamping coil portion is retained within an inner opening of an outer threaded bushing so that a torque of the thread bolt is transferable via the assembly locking device to the outer threaded bushing and/or b) wherein a cylindrical retaining portion of the assembly locking device is provided between the clamping coil portion and the positioning turn adapted to retain the assembly locking device within the component opening wherein the cylindrical retaining portion extends over an angular range of at least 270° about the central longitudinal axis of the wire coil and the cylindrical retaining portion is retained within an inner opening of an outer threaded bushing so that a torque of the thread bolt is transferable via the assembly locking device to the outer threaded bushing.

10. The thread bolt according to claim 9, wherein a friction ring is mounted on an outer bushing surface for locking the outer threaded bushing within a threaded opening.

11. A component having a component opening being stepped or not stepped in axial direction as well as being provided as a passage hole or blind hole, wherein in the component opening, the thread bolt according to claim 7 is arranged by means of the assembly locking device in a pull-out-proof manner.

12. A component in combination with the thread bolt according to claim 9, wherein the component has a threaded component opening being provided as a passage hole, wherein in the threaded component opening, the outer threaded bushing in combination with the thread bolt and the assembly locking device is arranged.

13. A manufacturing method of the assembly locking device according to claim 1, comprising winding a wire to form the wire coil consisting of a plurality of screw-like wound windings of the wire, having the first and the second end.

14. A connecting method of a first component and a second component, wherein the first component is the component according to claim 11 with the component opening being provided as the passage hole, and the second component has a second threaded opening adapted to the thread bolt, wherein the connecting method comprises the following steps:

a. arranging the first component and the second component opposite to each other so that the thread bolt of the first component is aligned with the second threaded opening of the second component, b. compressing the assembly locking device in an axial direction of the thread bolt thereby introducing a tip of the thread bolt into the second threaded opening of the second component, c. screwing the thread bolt of the first component into the second threaded opening of the second component so that the first and the second component are connected to each other.

15. A connecting method of a first component and a second component with tolerance compensation between the first and the second component, wherein the first component has a first threaded component opening being provided as a passage hole, wherein in the first threaded component opening, the outer threaded bushing in combination with the thread bolt and the assembly locking device according to claim 9 is arranged, and the second component has a second threaded opening adapted to the thread bolt, wherein the connecting method comprises the following steps:

a. arranging the first component and the second component opposite to each other so that the thread bolt of the first component is aligned with the second threaded opening of the second component, b. rotating the outer threaded bushing of the first component to be displaced in the direction of the second component for tolerance compensation therebetween, c. screwing the thread bolt of the first component into the second threaded opening of the second component so that the first and the second component are connected to each other.

16. The connecting method according to claim 15, comprising the further step of:

rotating the thread bolt together with the assembly locking device so that the torque of the thread bolt is transferred by friction to the outer threaded bushing for tolerance compensation between the first and the second component.

17. The connecting method according to claim 15, comprising the further step of:

abutting at the second component by the outer threaded bushing so that the rotation of the outer threaded bushing is stopped despite of further rotating the thread bolt.

* * * * *